United States Patent Office 3,404,984
Patented Oct. 8, 1968

3,404,984
PROCESS OF MAKING A FROZEN BACTERIAL
CONCENTRATE
Ronald H. Olsen, Kalamazoo, Mich., assignor to Dairy
Technics, Inc., Kalamazoo, Mich., a corporation of
Michigan
No Drawing. Filed Sept. 25, 1964, Ser. No. 399,335
2 Claims. (Cl. 99—91)

ABSTRACT OF THE DISCLOSURE

A stable bacterial concentrate useful for imparting desirable flavor, aroma and texture to bakery products is prepared by culturing certain species of Lactobacilli, concentrating (by centrifuging) and freezing.

---

This invention relates to a process for the manufacture of a concentrated bacterial culture. It also relates to a process wherein the bacterial culture is incorporated with other constituents of bakery doughs and/or mixes for the production of bakery products.

It is an object of this invention to provide a process for the production of a particular concentrated bacterial suspension which does not deleteriously affect the fermenting activity of the organism and which promotes uniformity and reliability in the finished product.

Another object of this invention is to provide a process, as aforesaid, which is practicable and workable with simplicity and, hence, may be incorporated into conventional methodology attendant to the manufacture of baked goods.

A further object of this invention is the provision of a process whereby the stability of the concentrated bacterial culture is enhanced thereby maintaining the desired fermenting activity until utilized in a commercial bakery.

A specific object of this invention is the provision of a particular concentrated bacterial culture and a process for preparing same which, when used properly, results in the manufacture of baked goods demonstrating improved flavor, texture and shelf-life characteristics as compared with similar baked goods manufactured according to prior art procedures of the type referred to hereinafter.

Bread and other baked goods based on ingredients commonly used in bread, are usually manufactured by (1) the batch preparation of doughs employing traditional methods, or (2) the newer continuous baking process wherein most of the admixing of ingredients, manipulation of doughs, and packaging of the finished product is controlled by automated devices. Some bakeries may employ a combination of the older traditional procedures and features of the newer automated process. Two continuous dough making processes presently in commercial use are known as the Do-Maker and the Amflow processes.

When the admixture and/or manipulation of bread ingredients is highly automated, certain desirable characteristics of the finished product are lost. Thus, the economies effected by automation are accompanied by a loss of taste and flavor of the finished baked goods. A highly automated baking process may be broken down into three phases: the preparation of "brews" wherein a part of the baked goods solids are dispersed in water with the addition of yeast; the admixture of brew with the remaining baked goods solids followed by shaping and working the resultant doughs into the desired configuration; and last, the movement of the finished doughs through a proofing chamber followed by baking in an oven. A distinctive feature of the highly automated process described above is the holding of liquid brews containing yeast and other bread constituents for approximately two and one half hours prior to the actual formation of a dough.

On the other hand, traditional, less automated procedures incorporate yeast into a dough matrix directly accompanied by a subsequent longer holding period for the formed doughs. Thus, the yeast fermentation may take place for longer periods of time in the dough itself, and this leads to greater flavor development and a more irregular and harder texture, which many bread purchasers desire.

Consequently, in view of the trend toward automation of the baking processes, the need exists for a process which retains the advantages of automation and which provides a baked product having the flavor and texture qualities attainable previously only by the older non-continuous procedures of baking. The use of a concentrated bacterial culture, prepared as described herein, makes it possible to retain the economies and conveniences of the continuous process while at the same time enhancing the highly desirable characteristics of flavor and texture of baked goods normally associated with older, more laborous bakery procedures.

The concentrated bacterial culture according to the invention also may be used to enhance the palatability of baked goods prepared by older more conventional procedures. In particular, it may be incorporated into ingredients and procedures used for the production of specialty baked goods, such as sour dough rye, sour dough french breads, muffins, or pancakes. With these products, the common practice has been the serial preparation of doughs or mixes in increasing quantities until the quantity needed for production is attained. The practice has been to start with a small portion of dough or culture having certain desirable flavor and fermentation characteristics and serially culture this material in increasing quantities. The use of the concentrated bacterial culture prepared as described herein allows the preparation of production-size doughs or mixes by a one step process involving the direct admixture of the concentrated bacterial culture to other ingredients. This mixture may then be held for time intervals prior to baking until the desirable fermentation characteristics are achieved. In this instance, the use of the concentrated bacterial culture prepared as described herein eliminates the requirement for scaling up from a small portion of fermented dough or mix to a production size quantity. Furthermore, standards of quality and flavor may be easily maintained from one bakery production run to the next due to the uniformity of the concentrated bacterial culture.

The objects of this invention are met by producing a stabilized and concentrated bacterial product of heterofermentative bacteria which are capable of producing acetic, lactic and propionic acids and belonging to the genus Lactobacillus. The Lactobacillus species suitable for this purpose are the mmebers of the group consisting of *L. pentoaceticus, L. buchneri, L. fermenti,* and *L. pastorianus.* At the present time *L. fermenti* is preferred because it is easier to grow on a commercial basis. The bacterial product has a high total bacterial concentration in excess of 10 billion per milliliter. Particular preferred bacterial products according to the invention have bacterial concentrations in the range of about 20–40 billion cells per milliliter. The product must be concentrated by centrifuging so that the soluble waste products of the culturing procedure are removed. The bacterial product contains by admixture at least 2 percent by weight of glycerol in addition to a suitable nutrient menstrum to be described later. In place of the glycerol, there can be used a similar amount of dimethylsulfoxide. This concentrate must be quickly frozen after formation thereof inasmuch as the freezing rate significantly affects the subsequent shelf life and activity of the product. With proper regard for the procedures described herein, viability and activity of the product may be maintained for long periods of time.

According to the method aspects of this invention, it is a critical feature that the bacterial culture be grown in a particular medium for a specified period of time.

The culture medium must consist of a (1) carbon source, such as dextrose, (2) yeast to provide vitamins, minerals, purines and pyrimidines, (3) a nitrogen source, such as skim milk solids, and (4) corn steep water. Also, the medium must either be maintained at a pH of 6.0–6.2 by continual monitoring and the addition of a suitable neutralizing agent as needed or, alternatively buffering ingredients must be added, in which case the medium can be neutralized every two hours or so.

A preferred procedure for obtaining significant cell crops is as follows. A culture medium is formulated by the solution of the following at the weight concentrations indicated: dextrose, 2 percent; yeast extract, 0.5 percent; nonfat dry milk solids, 1 percent or whey solids, 1 percent; corn steep water, 0.5 percent; $KH_2PO_4$, 0.28 percent; $Na_2HPO_4$, 0.19 percent; these are dissolved in tap water. Higher amounts of ingredients could be used but this would be wasteful because the growth would not be materially improved. In the case of the phosphates, higher amounts would actually decrease growth. Lesser amounts of the ingredients would lessen growth. The medium is heated to 95 degrees centigrade and held at this temperature for at least 0.5 hour. The initial pH of the medium is about 6.6. The medium is then rapidly cooled to 32 degrees centigrade and is inoculated with a mother culture of bacteria. The bacteria can be obtained from the American Type Culture Collection. The culture is incubated at 32 degrees centigrade until the pH drops to 5.60. Then, the culture is neutralized with alkali or carbonates, such as sodium hydroxide, to pH 6.60. This neutralization procedure is repeated twice wtih a 2½ hour holding period being provided between each neutralization. The organisms are then concentrated in solution by high-sped centrifugation. To the centrifugate is added at least 2 percent of glycerol and the mixture is quickly frozen at —70 degrees centigrade. A greater amount of glycerol can be used but it is not necessary. Also, the frozen product should contain some protein, at least about 0.5 percent by weight. If the centrifugate does not contain adequate protein, some of the culture medium can be added to the product before freezing to supply the deficiency.

Where the bacterial concentrated culture is to be stored for any appreciable period of time in excess of several days, it should be held at —20 degrees centigrade to maintain optimum activity and viability.

The centrifugate contains in addition to the bacteria, certain other unidentified, non-bacterial products of the culturing step, including enzymes, which do not form a true solution with water and which are retained with the bacteria in the solids discharged from the centrifuge. While it may be possible to remove these products from the bacteria, it is preferred not to do so because these products improve the rapidity of operation of the concentrate in the baking mix. It is believed that the presence of these products in the bacterial concentrate preadapts it for action on the flour so that it acts more quickly than would be the case if these products were not present.

The concentrated bacterial product can be used in a variety of ways to produce baked products of various types. The product finds its greatest utility in making yeast-leavened bakery products. However, it can be used to make non-yeast-leavened products since it is capable of producing carbon dioxide during the fermenting step. This would be done for some specialty baked goods, such as English muffins. Where a continuous bread making process is involved, the bacterial concentrate can be incorporated into a mixture of flour and water to form a preferment which after fermenting for a suitable period of time, e.g. 4 hours, is then mixed with more flour and water, yeast and other materials to form a "brew," which can then be fermented for a further period of time, usually about 2½ hours according to present commercial practice. Then the "brew" is mixed with the remaining baking mix solids to form the dough which is then processed to form loaves of bread as above described. The amount of flour and water used to make the pre-ferment can be varied widely, e.g. 2–30 percent or more of the total water and 0.5–15 percent or more of the total flour in the bread mix. The formula used to make the pre-ferment depends on the preference of the baker, the equipment available, etc., and it can be widely varied.

The pre-fermenting step can be eliminated in which case the concentrated bacterial product can be incorporated directly into the "brew," following which the brew is fermented and then mixed with the remaining solids as above described.

Where the pre-ferment step is eliminated, a longer fermenting period for the "brew" may be desirable to assure maximum flavor development. Alternatively, the brew fermenting period may be kept the same, in which case somewhat less flavor may be developed.

The concentrated bacterial product also can be used in batch-type yeast-leavened baking processes. The bacterial product can be mixed directly with the other ingredients of the baking mix and the mix can then be further processed in accordance with known procedures for handling the particular baking mix involved. In this regard it should be noted that the use of the bacterial product will insure maximum flavor and aroma of the baked product and, thus, will avoid the problem of variation of flavor and aroma which is occasionally and unpredictably encountered with certain types of highly flavored specialty products. Further, many types of specialty breads are made from cultures, commonly called "sours," which differ from each other essentially in that they contain different yeasts. These sours are difficult to handle so that only a relatively few bakers produce such products. By using the concentrated bacterial product of the invention, it is possible to produce relatively highly flavored specialty breads without taking great precautions.

The concentrated bacterial product can be used with various bakery mix formulas. As the bakery mix formulas themselves can be of any suitable type and form no part of the invention, a detailed discussion of them is believed to be unnecessary. It is to be noted, however, that the formulas will include flour, water and yeast plus perhaps various other materials, such as yeast food, sugar, vitamin enrichment, salt, shortening, etc., all in accordance with conventional techniques.

The amount of the concentrated bacterial product used can be varied depending primarily on the following factors:

(1) The amount of fermenting time available.
(2) The amount of flavor development desired.
(3) The cost of using the concentrate.

Fermenting time is increased or the amount of flavor development is decreased by using lesser amounts of the bacterial concentrate. The maximum amount of the concentrate used ordinarily will not exceed about 0.1 percent of the total weight of the flour in the baking mix because the use of greater amounts would increase the cost, without any corresponding increase in the quality of the product.

For continuous bread making processes involving a brew holding time of about 2½ hours, an amount of the bacterial concentrate equal to from about 0.018 to 0.1 percent of the total weight of the flour in the baking mix, preferably 0.075 percent can be used.

The invention will be further described with reference to the following examples which are given for illustrative purposes only.

Example I.—Continuous bread making using pre-ferment

(A) Large pre-ferment volume method (1) A pre-ferment was formed by culturing at 100 degrees F. the following ingredients:

| | | |
|---|---|---|
| Water | pounds | 436 |
| Flour | do | 269 |
| Culture [1] | ounces | 24 |

[1] In this and succeeding examples, the frozen bacterial culture concentrate was thawed by immersion of the container in tepid water, or, by overnight incubation at room temperature (74 degrees F.).

(2) After 4 hours, pre-ferment was combined with the following to form a brew:

| | |
|---|---|
| Water | 894 lbs. |
| Flour | 269 lbs. |
| Yeast | 70 lbs. |
| Yeast Food | 13 lbs. 7 oz. |
| Sugar Syrup (66½ Brix) | 62 lbs. |
| Monocalcium Phosphate | 2 lbs. 5 oz. |
| Malted Wheat Flour | 3 lbs. 12 oz. |
| Vitamin Enrichment | 18 wafers. |
| Nonfat Milk Solids | 35 lbs. |
| Salt | 41 lbs. |
| Emulsifier | 8 lbs. 8 oz. |

(3) This brew was held at 86 degrees F. for 2 hours, then it was pumped to another holding tank where it was held for ½ hour at 80 degrees F.

(4) Then, the brew was fed into the continuous mix equipment where it was mixed with 1250 lbs. flour and 60 lbs. shortening and then it was extruded into dough form at 100 degrees F. and held in the proof chamber approximately 55 minutes at 110 degrees F. Then the dough was baked.

(B) Small pre-ferment volume method (1) A pre-ferment was formed by culturing at 100 degrees F. in a 50 lb. stainless container the following ingredients:

| | | |
|---|---|---|
| Water | pounds | 23 |
| Flour | do | 9 |
| Culture | ounces | 24 |

(2) After 4 hours, the pre-ferment was combined with the following:

| | Pounds |
|---|---|
| Water | 1300 |
| Flour | 538 | and the other ingredients listed in Section 2 of Part A.

(3) The subsequent manipulation of the brew was the same as in Sections 3 and 4 of Part A.

The bread products of Parts A and B had a better flavor and aroma, a harder texture, were easier to slice and had a longer shelf life than bread products made from the same formula but without the bacterial concentrate.

Example II.—Direct inoculation of continuous mix brew with no holding

In this instance, the thawed concentrated bacterial culture (24 oz.) was added directly to the continuous mix brew which consisted of the sum of the ingredients listed in Sections 1 and 2 of Part A. The subsequent handling of the brew was the same as in Sections 3 and 4 of Part A. The bread product exhibited the same improved qualities as the bread products of Example I, although to a somewhat lesser degree.

Example III.—Direct inoculation of non-continuous mix formulations

Highly flavored conventional white bread and/or specialty bakery products can be prepared by the admixture of thawed concentrated bacterial culture to batch formulations. The ratio of culture to flour content of these items is 24 oz. culture per 2000 lbs. flour. The concentrate can be added to the mix comprising flour, water and yeast (or sour). The mix can then be allowed to rise at 78–85 degrees F. for several hours and then can be proofed and baked in accordance with conventional procedures.

Although particular, preferred embodiments of the invention have been disclosed herein for illustrative purposes, it will be understood that modifications or variations of such disclosure, which lie within the scope of the appended claims, are fully contemplated.

The embodiments of the invention in which an exclusive property or privilege is claimed are defined as follows:

1. A method of preparing a stable material useful for imparting desirable flavor, aroma and texture characteristics to bakery products, comprising inoculating a culture medium with a bacteria selected from the group consisting of L. pentoaceticus, L. buchneri, L. fermenti and L. pastorianus, said culture medium consisting essentially of a carbon source, yeast, a nitrogen source and corn steep water, incubating the culture while maintaining the pH between about 5.6–6.6, centrifuging the solution to obtain a concentrated bacteria product and then quickly freezing the product.

2. A method of preparing a stable material useful for imparting desirable flavor, aroma and texture characteristics to bakery products, comprising inoculating a culture medium with a bacterial selected from the group consisting of L. pentoaceticus, L. buchneri, L. fermenti and L. pastorianus, said culture medium consisting essentially of about 2 percent dextrose, about 0.5 percent yeast extract, about 1 percent skim milk solids, about 0.5 percent corn steep water, about 0.28 percent $KH_2PO_4$, about 0.19 percent $Na_2HPO_4$ and the balance water, incubating the culture until the pH drops to about 5.6, neutralizing the culture to about pH 6.6, holding the culture for about 2½ hours and then neutralizing the culture to about pH 6.6, repeating the holding and neutralizing steps at least once, centrifuging the solution to obtain a concentrated bacteria product, mixing in said product at least about 2% by weight of a material selected from the group consisting of glycerol and dimethylsulfoxide and then quickly freezing the product.

References Cited

UNITED STATES PATENTS 1,946,447  2/1934  Stiles _____ 195—48 X

FOREIGN PATENTS 684,530  4/1964  Canada.

OTHER REFERENCES

Joslyn et al., Food Processing Operations, vol. two, 1963, pages 483 to 488 and 497.

Journal of Dairy Science, vol. 45, October 1962, pages 1271–1280 and pages 1290–1294.

LIONEL M. SHAPIRO, *Primary Examiner.*